United States Patent
Tegerdine et al.

(10) Patent No.: US 11,573,085 B2
(45) Date of Patent: Feb. 7, 2023

(54) POSITIONING SYSTEM AND METHOD

(71) Applicant: Raytheon Systems Limited, Harlow (GB)

(72) Inventors: David R. Tegerdine, Fowlmere (GB); Timothy J. Palmer, Soham (GB); Peter A. Langsford, Great Dunmow (GB)

(73) Assignee: Raytheon Systems Limited, Harlow (GB)

( * ) Notice: Subject to any disclaimer, the term of this patent is extended or adjusted under 35 U.S.C. 154(b) by 270 days.

(21) Appl. No.: 16/946,565

(22) Filed: Jun. 26, 2020

(65) Prior Publication Data
US 2020/0408530 A1 Dec. 31, 2020

(30) Foreign Application Priority Data
Jun. 28, 2019 (GB) .................................. 1909371

(51) Int. Cl.
*G01C 21/16* (2006.01)
*G01C 21/00* (2006.01)
*G01C 21/36* (2006.01)

(52) U.S. Cl.
CPC ......... *G01C 21/165* (2013.01); *G01C 21/362* (2013.01); *G01C 21/3844* (2020.08)

(58) Field of Classification Search
CPC ................ G01C 21/165; G01C 21/362; G01C 21/3844; G01S 19/49; G01S 5/0263
See application file for complete search history.

(56) References Cited

U.S. PATENT DOCUMENTS

| | | | |
|---|---|---|---|
| 2002/0098839 A1 | 7/2002 | Ogino et al. | |
| 2003/0122711 A1 | 7/2003 | Panasik et al. | |
| 2004/0150557 A1 | 8/2004 | Ford et al. | |
| 2009/0043504 A1* | 2/2009 | Bandyopadhyay | .... G01C 17/38 |
| | | | 701/469 |
| 2009/0121940 A1 | 5/2009 | Ladd et al. | |

(Continued)

FOREIGN PATENT DOCUMENTS

| | | |
|---|---|---|
| AU | 2014277724 A1 | 1/2015 |
| WO | 2011042726 A1 | 4/2011 |

OTHER PUBLICATIONS

Combined Search and Examination Report in connection with UK Patent Application No. GB1909369.9 dated Dec. 2, 2019, 6 pages.

(Continued)

*Primary Examiner* — Tyler J Lee
*Assistant Examiner* — Yufeng Zhang

(57) ABSTRACT

Systems and methods utilize an inertial navigation subsystem configured to determine a plurality of relative positions of the navigation system from a reference position based on the determined speed and/or acceleration and/or direction of the navigation system and/or changes thereto; and a position estimator sub-system configured to estimate the absolute position of the navigation system based on at least two received signals. A first track is defined based on the plurality of relative positions determined by the inertial navigation sub-system during a period of time and a second track is defined based on the plurality of estimates of the absolute position by calculating a best fit using the plurality of estimates of the absolute position, where the second track approximates a same shape as the first track.

25 Claims, 5 Drawing Sheets

(56) References Cited

U.S. PATENT DOCUMENTS

| | | | |
|---|---|---|---|
| 2013/0229303 A1 | 9/2013 | Marshall | |
| 2013/0235864 A1 | 9/2013 | Do et al. | |
| 2013/0331121 A1 | 12/2013 | Bandyopadhyay et al. | |
| 2016/0088429 A1 | 3/2016 | Gao et al. | |
| 2016/0146922 A1 | 5/2016 | Moshfeghi | |
| 2016/0353238 A1 | 12/2016 | Gherardi et al. | |
| 2017/0016870 A1* | 1/2017 | McPeek | G01N 33/025 |
| 2017/0078851 A1 | 3/2017 | Agrawal et al. | |
| 2020/0200860 A1* | 6/2020 | Hong | H04B 17/318 |
| 2020/0371193 A1 | 11/2020 | Marshall et al. | |

OTHER PUBLICATIONS

Combined Search and Examination Report in connection with UK Patent Application No. GB1909371.5 dated Dec. 2, 2019, 7 pages.

U.S. Appl. No. 16/946,566 entitled "Positioning System and Method" filed Jun. 26, 2020, 29 pages.

Office Action dated Oct. 4, 2021 in connection with U.S. Appl. No. 16/946,566, 13 pages.

Notice of Allowance dated Mar. 18, 2022 in connection with U.S. Appl. No. 16/946,566, 9 pages.

* cited by examiner

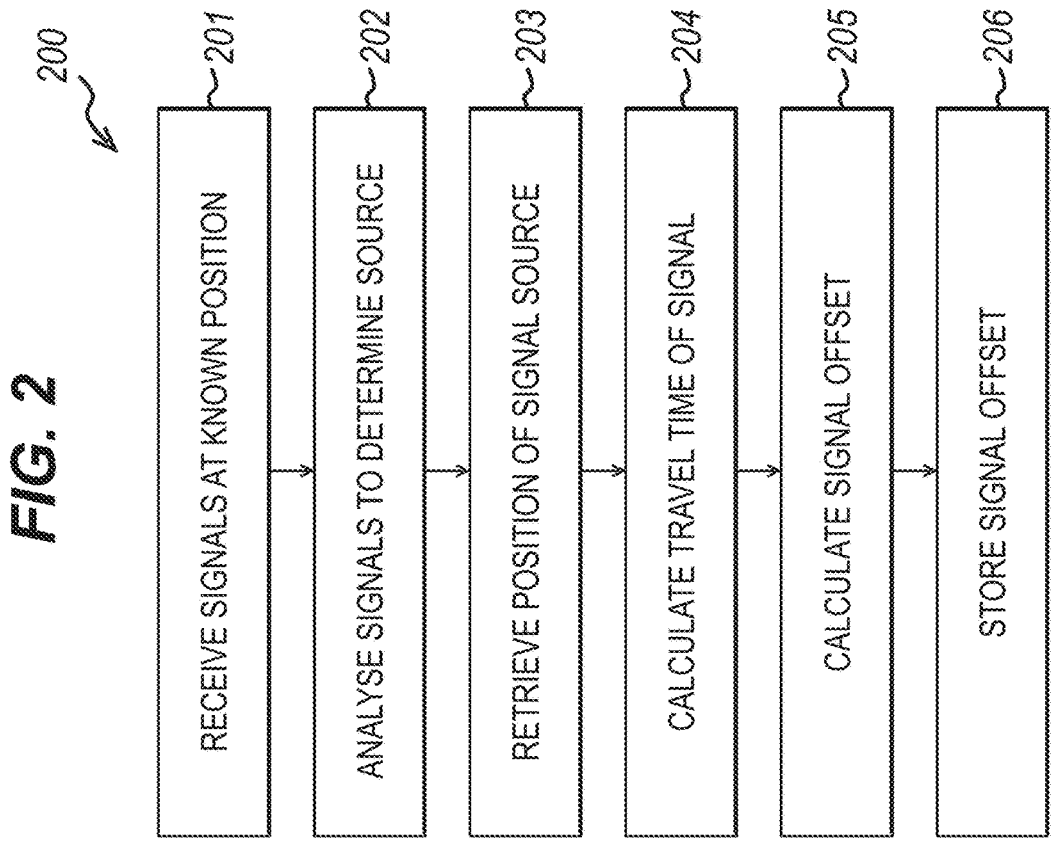

POSITIONING SYSTEM AND METHOD

CROSS-REFERENCE TO RELATED APPLICATION AND PRIORITY CLAIM

This application claims priority under 35 U.S.C. § 119 to United Kingdom Patent Application No. 1909371.5 filed on Jun. 28, 2019, which is hereby incorporated by reference in its entirety.

TECHNICAL FIELD

The present invention relates to systems and methods for determining a position using an inertial navigation sub-system and a position estimator sub-system configured to estimate position based on received signals.

BACKGROUND

GNSS (global navigation satellite systems) use satellites to provide geo-spatial positioning. A GNSS receiver receives signals from GNSS satellites and uses the known positions of the GNSS satellites to calculate the position of the receiver. One example of a GNSS system, GPS (global positioning system), uses a constellation of satellites that continuously transmit their current position and the time held by atomic clocks on board the satellites. A receiver monitors the signals from multiple satellites and uses the position and time transmitted by the GPS satellites to determine its own position.

However, GNSS signals are typically very weak so are easily blocked by buildings or geological features such as mountains or cliffs. The relatively weak signal strength makes it particularly easy for an attacker to broadcast a spoofed GNSS signal or to jam GNSS signals. Furthermore, the satellites themselves are a potential weak link in the chain—if a sufficient number of satellites malfunction or are otherwise rendered inoperative, the receivers on the ground will be unable to determine a geolocation.

Thus, GNSS systems have the disadvantage that if no source signal is available, for any of the reasons mentioned above, they are no longer able to determine a geolocation. Given the extensive reliance of civilian and military activities on GNSS services, there is therefore need for a positioning device which does not rely on such satellite-based positioning systems.

Modern alternatives to GNSS systems include inertial navigation systems which employ accelerometers, gyroscopes, electronic compasses etc. to provide relative position information (changing location from a known start point) through dead-reckoning techniques. Such systems do not require external signals and therefore have benefits where external signals cannot be obtained, either through the geography of the particular location of the device, or through interference or other interruption. Moreover, the shape of a track plotted by an inertial navigation is generally highly accurate and can be relied upon. However, such systems exhibit significant drift over time between actual and estimated positions. Although the shape of the track is accurate, drift can affect both the actual position and the orientation of the track. This means that these systems are ineffective over time and during extended periods where no external reference signal is available.

Accordingly, there is the need to provide a positioning device which can provide an indication of its position without reliance on GNSS systems and which can maintain an accurate position estimate over long periods of time and large distances.

SUMMARY OF THE INVENTION

According to one aspect of the invention, there is provided a navigation system comprising an inertial navigation sub-system and a position estimator sub-system. The inertial navigation sub-system is configured to determine a plurality of relative positions of the navigation system from a reference position based on the determined speed and/or acceleration and/or direction of the navigation system, and/or changes thereto. The position estimator sub-system is configured to estimate the absolute position of the navigation system based on at least two received signals.

The system comprises a processor configured to do a number of things. Firstly, the processor is configured to define a first track based on the plurality of relative positions determined by the inertial navigation sub-system during a first period of time. Secondly, the processor is configured to cause the position estimator to generate a plurality of estimates of the absolute position of the navigation system during the first period of time. Finally, the processor is configured to define a second track based on the plurality of estimates of the absolute position by calculating a best fit using the plurality of position estimates, the second track approximating the same shape as the first track.

In some embodiments, the processor may determine a deviation in the position and/or orientation of the first track based on the position and orientation of the second track and either update the reference position or generate a new reference position for the inertial sub-system based on the determined deviation.

Preferably, the processor is configured to calculate the best fit by performing a regression analysis on the plurality of estimates of the absolute position, wherein the regression analysis is preferably one of a linear regression and a least squares analysis, preferably a weighted least squares analysis.

The at least two received signals preferably include at least two GNSS signals from GNSS satellites. Alternatively or additionally, at least two received signals may include at least two uncoordinated signals, each of which comprises timing information and is provided from a separate fixed terrestrial or geostationary source.

Preferably, each of the plurality of estimates of the absolute position is associated with a confidence level based on one or both of: the strength of one or more of the received GNSS signals used to generate the estimate; and the level of radio frequency interference at the time the estimate is generated.

In some embodiments, the processor may be configured to apply a weighting to at least one, preferably a subset, preferably all of the plurality of estimates of the absolute position, and calculate the best fit based on the applied weightings.

Preferably the processor is configured to update the reference position or generate a new reference position for the inertial sub-system based on a position estimate from the position estimate sub-system.

Preferably, the processor is configured to update the reference position or generate a new reference position when the confidence level is above a threshold value.

In some embodiments, in a first mode, the system is configured to output a location to a user based upon estimates of absolute position that are generated based on GNSS signals, preferably based only on GNSS signals. In a second mode the system is configured to output location to a user based upon either or both of: a determined relative position of the system from the reference position, and estimates of absolute position that are generated based on uncoordinated signals.

The system may be configured to switch from operating in the first mode to operating in the second mode when the confidence level of at least one, preferably a plurality of estimates of absolute position is below a threshold.

In a second aspect of the invention, there is provided a method for determining the position of a navigation system, the method comprising: determining a plurality of relative positions of the navigation system from a reference position based on the determined speed and/or acceleration and/or direction of the navigation system, and/or changes thereto; defining a first track based on the plurality of relative positions determined during a first period of time; generating a plurality of estimates of the absolute position of the navigation system based on at least two received signals during the first period of time; and defining a second track based on the plurality of estimates of the absolute position by calculating a best fit using the plurality of position estimates, the second track approximating the same shape as the first track.

Preferably the method comprises determining a deviation in the position and/or orientation of the first track based on the position and orientation of the second track and either updating the reference position or generating a new reference position based on the determined deviation.

In a third aspect of the invention, there is provided a processor module for a navigation system, the module configured to receive a plurality of relative positions from an inertial navigation sub-system during a first period of time; define a first track based on the plurality of relative positions; receive a plurality of estimates of absolute position from a position estimator sub-system during the first period of time; and define a second track based on the plurality of estimates of the absolute position by calculating a best fit using the plurality of position estimates, the second track having the same shape as the first track.

In a fourth aspect, there is provided a computer readable medium comprising computer readable instructions which, when implemented by a computer, cause the computer to perform the method set forth above.

BRIEF DESCRIPTION OF THE DRAWINGS

FIG. 2 depicts a calibration method of the present invention.
FIG. 3 depicts a positioning method of the present invention.

DETAILED DESCRIPTION

Figure 1:
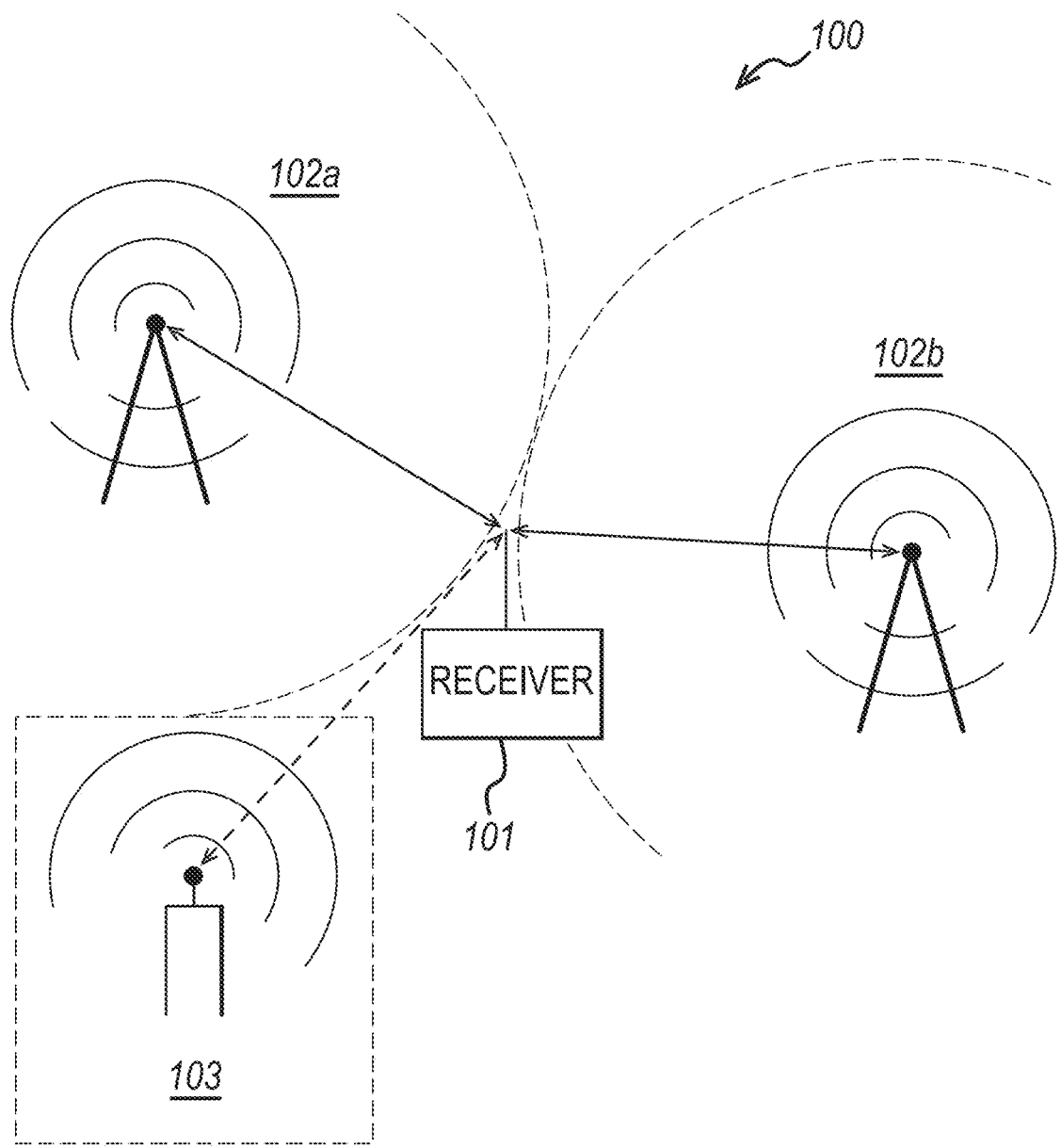
FIG. 1 shows an overview of the system of the invention.

The positioning system and method of the present invention solve the above mentioned problem of determining a position by utilizing the shape of a track that is generated using an inertial navigation system, which is assumed to be accurate, and correcting for any drift by reference to a plurality of position estimates that are determined by reference to received signals such as GNSS or others (described elsewhere herein). An advantage of the system and method of the invention is that it does not rely on the accuracy of the position estimates provided by received signals, which may be unreliable for reasons given above.

It is well known in the art how to estimate position using a GNSS system, so it will not be repeated here. Moreover, GNSS is not the only way to estimate position using received signals, and described herein is a system and method for determining position without reference to GNSS signals by using uncoordinated (and, possibly, non-cooperative) signals of opportunity containing timing information as references. In the present context, "uncoordinated" means that the broadcast of the signals occurs independently, without reference to one another. The term "signal of opportunity" means a signal broadcast by a third party that can be received at a given position. The timing information may include precise timing information encoded in the signal of opportunity, or may simply be a signal with an accurately timed repetitive structure. However, detailed knowledge of the signal structure is not necessarily required to obtain useful timing information that could be used as part of a position determination.

An example of uncoordinated signals of opportunity that may be used by the present invention are radio time signals, also referred to as national time standards. Radio time signals are typically, but not exclusively, broadcast on the VLF and LF radio bands (e.g. 3 to 300 kHz) and have reasonably predictable radio propagation characteristics, resulting in low uncertainty in the received time signals. Because of their relatively long wavelength, these radio time signals tend to diffract over geological obstacles such as mountain ranges and follow the contour of the Earth. This means that radio time signals are receivable over very large areas, often overlapping with other radio time signals.

Of course, the present invention is not limited to using radio time signals as references. Other suitable signals of opportunity exist, such as TV and radio broadcast signals, ad-hoc signals (as described in more detail with respect to FIG. 4), and navigational aids, such as airport directional signals and non-directional beacons, or radio time signals broadcast on higher frequencies. It will be appreciated that this list is not exhaustive and any receivable signal containing timing information, such as an accurately timed repetitive structure, may be used. However, these signals may contain less accurate timing information or be more greatly influenced by radio propagation effects across large areas, so might only be used when other, more stable signals, such as a longwave radio time signal, are not available. Furthermore, medium and high frequency signals are more likely to travel as skywaves than low frequency signals, thus reflecting or refracting from the upper atmosphere back towards the earth. These reflections and refractions vary depending on the time of day, resulting in different effective paths from the signal source to a receiver, which makes these higher-frequency signals less consistent for use as a reference in a positioning system or method. Where signals reflect or refract, multipath propagation of those signals from the source to receiver can also cause undesirable interference at the receiver.

These signals are uncoordinated in that the timing information that is part of each signal is not synchronized to the timing references of the other signals. In GPS, for example, the clocks of the individual satellites are regularly resynchronized to ensure that the timing information in the signals broadcast by the satellites is synchronized. As another example, now-defunct hyperbolic/multilateration systems such as LORAN (and its various incarnations), in which a master station broadcast a signal first and a pair of permanently associated slave stations transmitted second and third in sequence. Hence, even though the individual stations were not necessarily synchronized, co-ordination between the stations was still an integral part of the system.

An advantage of uncoordinated signals of opportunity, such as radio time signals, is that they are particularly resistant to disruption and highly resilient to failure of any individual signal source. Radio time signals in particular require large antennas, up to several hundred meters long, to broadcast at longwave frequencies. This makes it particularly difficult for an adversary to jam or otherwise interfere with radio time signals, making them reliable as references in a positioning system or method. Furthermore, radio time signals are broadcast on many different frequencies, making it even more difficult to jam or otherwise interfere with the time signals.

FIG. 1 depicts a system 100 according to the present invention which may be used to determine position by receiving multiple uncoordinated signals containing timing information. A receiver 101 is located in an environment where multiple signals of opportunity are present. Two signal sources 102a and 102b are depicted in FIG. 1, but it will be appreciated that any number of signals of opportunity from any number of sources may be used, if available. As discussed above, these signals contain timing information and may be, for example, a radio time signal. The sources 102a-b of the signals may be at fixed terrestrial positions or in geo-synchronous orbit, i.e. not moving relative to the surface of the Earth. The receiver 101 can be adapted to use signals broadcast by moving sources if continuous up-to-date knowledge of the source's position is available to the receiver. The receiver 101 is configured to determine a position, i.e. a position relative to the surface of the earth, such as longitude-latitude, based on the signals broadcast by sources 102a-b and, optionally, an ad-hoc source(s) 103, as explained in more detail below. The receiver 101 may include a memory that stores the known positions of the potential signal sources, including sources 102a-b, e.g. in a database. For example, most radio time signals are broadcast from known locations around the world. The MSF signal in the United Kingdom is broadcast from Anthorn Radio Station in Cumbria, at 54.911° N 3.280° W. Corresponding information is generally available for other radio time signals.

The memory or data store of the receiver 101 may also include characteristics of the signals that can be used a) to lookup a signal source's position based on characteristics of the signal, as described with respect to FIGS. 2 and 3 below, and b) as a reference so that a processor of the receiver 101 is able to decode the timing information contained in different signals. For example, different radio time signals encode timing information in different ways, and different algorithms must be employed to decode the timing information from the signals. Further characteristics that may be used to identify a given signal include physical characteristics of the signal, such as the amplitude, frequency or phase modulation contained within a signal, any embedded digital signaling, or the overall signal structure. Similarly, a known broadcast schedule may identify the signal, or even the signals themselves may even include some identifier.

The receiver 101 may also include a GNSS receiver and/or a clock, which can be used to provide a position when GNSS is available, or used to provide the initial known location for synchronization, as described elsewhere herein. The present invention may utilize any kind of signal which can be used to determine location, including either or both of a GNSS signal and an uncoordinated signal, as described above. In the present context, a location determined using a received signal (be it GNSS or uncoordinated, and irrespective of accuracy) is referred to as a position estimate.

In the present invention, the receiver 101 also includes an inertial positioning system or equivalent independent means of providing position information. The inertial positioning system is used to provide short-term updates to the receiver's location using dead reckoning, as described in more detail below.

In order to determine the position of the receiver 101 using uncoordinated signals, and using trilateration or multilateration it is necessary to know a) the positions of the signal sources 102a-b and b) the relative synchronization of the signals to one another (in the case of multilateration), or to the internal clock of receiver 101 (in the case of trilateration). FIG. 2 depicts a calibration method 200 that is used to determine the relative synchronization of the signals to one another, or to an internal clock of receiver 101.

At step 201, the receiver 101 receives one or more signals, such as the signals of opportunity described above, that may be used in a later position determination. The receiver 101 analyses the electromagnetic radiation received at one or more antennas in order to detect any signals, such as the signals of opportunity described above, that are present/can be received at the receiver's present location. In particular, the receiver 101 may filter a wideband sample at any number of frequencies of interest to determine if a signal is present at that frequency, e.g. by determining a signal to noise ratio. The receiver 101 receives the signals at an initial known position. The initial known position may be known based on a functional GNSS receiver, a known location based on geographic surroundings or monuments, map reading, or any other available method of positioning.

At step 202, once the signals have been detected and the initial known position established, the receiver 101 analyses the received signal to determine characteristics that identify the signal, and thus the signal's source, in order to determine the position of a signal source from a received signal. For example, the MSF signal referred to above is broadcast at a frequency of 60 kHz and uses a defined signal structure to encode time information.

At step 203, from the determined characteristics of the signal, e.g. the frequency and protocol, the receiver 101 looks up the corresponding position of the signal source from the positions of signal sources stored in the memory of the receiver 101. Of course, it will be appreciated that other characteristics of the signal may be used in addition to or instead of the frequency and/or protocol. Furthermore, where signals of opportunity include position information encoded in the signal along with timing information, the position can be obtained directly from the signal without reference to the position data stored in the memory of the receiver 101.

At step 204, the receiver 101 uses the positions of the signal sources 102a-b to calculate the travel time of the signals, i.e. the time taken for the signals to reach the receiver 101 from the signal sources 102a-b, based on the speed of propagation and the propagation distance between the receiver 101 and the signal sources 102a-b.

At step 205, the propagation times of the signals are then subtracted from the timing information received as part of the signals in order to determine the relative synchronization, or time offset, of the timing information relative to the timing information of other signals or relative to a local clock, e.g. an internal clock of the receiver 101. The timing references in a radio time signal, for example, are very accurate and often based on atomic clocks, so the synchronization of the timing information in the radio time signals, i.e. the offset, relative to other timing references is much more stable than the synchronization or offset with respect to an internal clock of the receiver 101.

At step 206, the synchronization information, i.e. the offset, is stored in a memory of the receiver.

It will be appreciated that while the calibration method 200 described above needs to be performed in order to determine the synchronization information, the method 200 may, but need not, be performed by the same receiver 101 that subsequently uses the synchronization information to determine an unknown position, as described below with respect to FIG. 3.

Furthermore, the calibration method 200 may be repeated at regular or irregular intervals in order to correct for drift between the timing information contained in the signals and, if used, the internal clock of the receiver 101. For example, where higher frequency signals are used, the calibration method 200 may need to be repeated relatively frequently in order to maintain the system's accuracy due to the changing travel times caused by the increased influence of skywaves, e.g. at least twice per day. Where lower frequency signals are used and where the synchronization information defines an offset between the time signals themselves, rather than a clock of the receiver 101, the relative drift will be much smaller and the calibration method 200 may need to be performed much less frequently, e.g. once per week, month or longer. Where the synchronization information defines an offset between the time signals and a clock of the receiver, the calibration method 200 or part thereof may be repeated much more often to account for drift in the internal clock, e.g. once per hour, or every time a known initial position can be determined.

It will also be appreciated that the calibration method 200 does not need to be repeated for every possible pairing of signals. If synchronization information has already been determined for signals A and B, and the synchronization information defines an offset between the timing information of signal A and the timing information of signal B, then the offset between signal A and signal C can be calculated based on a measured offset between signals B and C without requiring separate measurement of the offset between signals A and C.

The accuracy of the calibration method can be further improved by repeating the calibration method 200 at multiple initial known positions. For example, where the receiver 101 of the present invention is provided in a composite system with another accurate positioning system(s), such as a GNSS receiver, the calibration method 200 may be repeated at multiple known initial positions as long as the other positioning system(s) is functional.

FIG. 3 depicts a method 300 of determining the position of the receiver 101 based on known synchronization, which may have been determined by the receiver 101, or a different receiver, using the calibration method 200 described above.

At step 301, the receiver 101 detects and receives two or more signals, such as the signals of opportunity, containing timing information, as described with respect to step 201 above. At this point, the position of the receiver 101 may be completely unknown, or may be known with low accuracy or high uncertainty. For example, if the positioning method 300 is used as a stand-alone positioning system, the current position of the receiver 101 may be unknown if the receiver 101 has moved since a previous position determination. However, if the positioning method 300 is used in conjunction with an inertial positioning system and dead reckoning techniques, the location of the receiver 101 may be known, albeit it with relatively low accuracy, i.e. to a lower accuracy than the positioning method 300 can provide.

At step 302 and 303, the receiver 101 analyses the received signals to determine the sources of the signals and retrieves or otherwise determines the positions of the signal sources, as described above with respect to method 200 at steps 202 and 203.

At step 304, the receiver 101 retrieves the relevant synchronization information, i.e. synchronization information relevant to the particular received signals, from the memory of the receiver 101 or any other suitable source, such as a network location. The relevant synchronization information may be identified in much the same way as the sources of the signals.

Figure 5A:
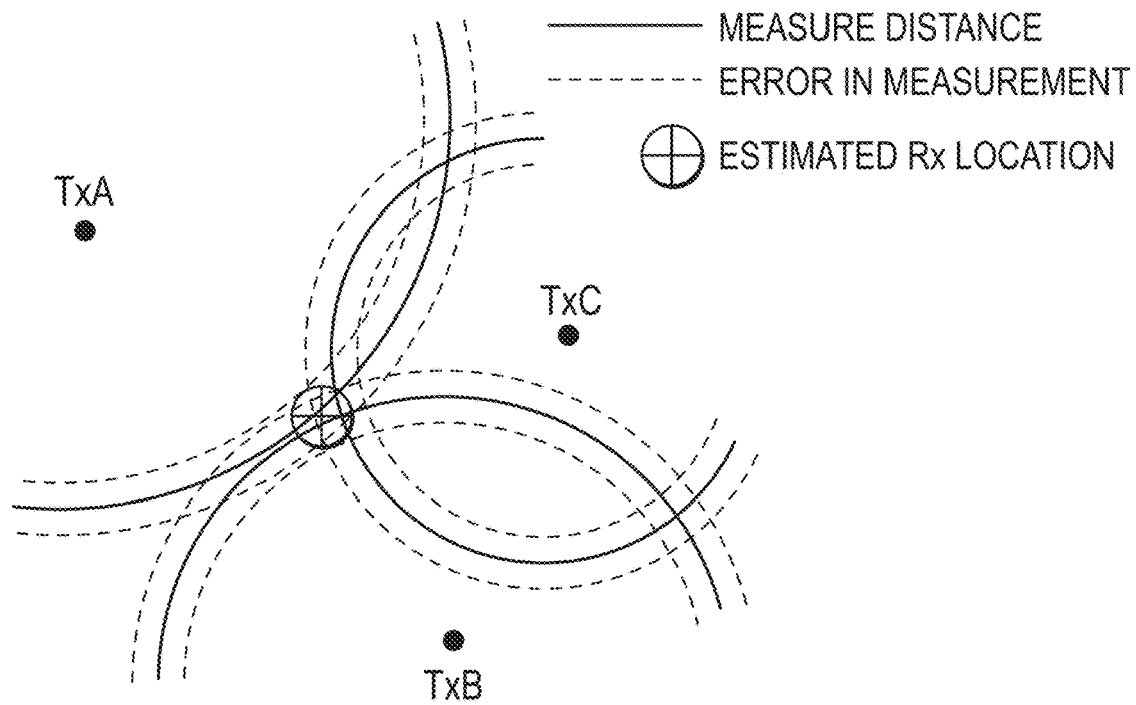
FIGS. 5a and 5b depicting the methods of trilateration and multilateration used in the present invention.
Figure 5B:
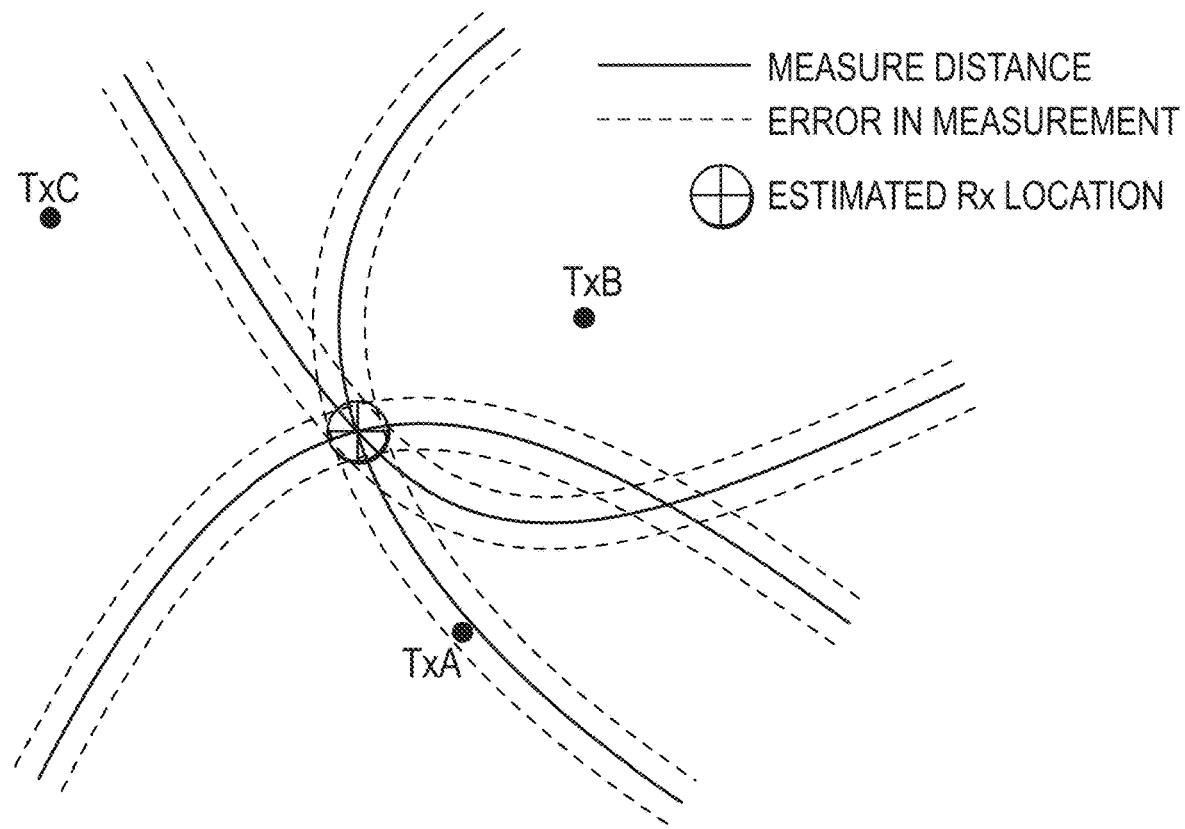

At step 305, once the synchronization information has been retrieved, the receiver 101 calculates the position of the receiver 101. In the case that a local reference clock is available, the synchronization information is used to apply corrections to the measured time of arrivals for each of the received signals. The position of the signal sources TxA, TxB and TxC, time of arrivals and the propagation speed is then used to calculate the distance from each of the source transmitters. Trilateration calculations, projected onto a model of the Earth's surface (for example WGS84 or other), may then be applied to estimate the receiver's position as shown in FIG. 5a. In the case that an accurate local clock is not available, the time difference of arrival between the received signals, and hence the distance ratio between two signal sources, and multilateration calculations may be used to estimate receiver location as shown in FIG. 5b. Systematic errors—owing to the estimation of signal timings, the synchronization information, the model of Earth used, estimation of the signal propagation speed and other factors—may result in an uncertainty, and/or potentially conflicts, in the distance circles (or hyperbolic curves, in the case of multilateration) and therefore location of intersections shown in FIGS. 5a and 5b. Position will likely be estimated (using iterative methods or other) as the best fit location at which the combined error between the calculated distances, between the estimated location and the signal sources, and the measured distances, between the estimated location and the signal sources, is minimized. It will be appreciated that while FIGS. 5a and 5b show three signal sources TxA, TxB and TxC, any number of signals and signal sources greater than or equal to two may be used. Whilst three sources are useful to provide an unambiguous position solution, two sources would provide two possible positions and the system could be configured to reject one of the possible positions based on other information, such as it being on land for a sea-based application of vice-versa.

As mentioned above, the system 100 may further include one or more ad-hoc transmitters 103. The ad-hoc transmitter 103 is configured to re-transmit a weak signal of opportunity (at the same or a different frequency) or to transmit an original signal containing timing reference information. The ad-hoc transmitter 103 can be deployed in environments where signals of opportunity are sparse or weak in order to provide further coverage of a particular area and increase the accuracy of the positioning system and method. Moreover, the signals broadcast by the ad-hoc transmitters 103 may be the only signals that are used by the receiver 101 to determine its position.

While radio time signals are based on one or more atomic clocks, which are exceptionally accurate, it is expensive to provide ad-hoc antennas for deployment in the field which contain their own atomic clocks. It is therefore possible for the ad-hoc transmitter 103 to either retransmit a weak radio time signal, or use the weak radio time signal as a timing reference to generate its own signal. Of course, it is increasingly possible to provide ad-hoc transmitters with their own atomic clocks (or other accurate timing sources), which can be used in the present system and method without relying on any external timing references, such as the radio time signals. While these atomic clocks are generally less accurate and stable than those used in the production of radio time signals, they are accurate enough to provide signals that can be used to determine an accurate position using the present invention for more limited time periods. As long as the receiver 101 is aware of the position of the ad-hoc transmitter 103, the ad-hoc transmitter can be used by the receiver 101 to determine its position, along with received signals of opportunity, in the same way as described above with respect to FIG. 3. The position of the ad-hoc transmitter may be fixed or may be moving, for example on a naval (or airborne) vessel. As long as the position of the transmitter at any given time is known by the receiver 101, the ad-hoc transmitter 103 can still be used by the receiver 101 in the determination of its position.

While the present system and method are capable of operating in isolation of other positioning systems, in practice the use of radio time signals, or other similar signals, in the longwave band means that the signals must be received for a relatively long time in order to obtain the necessary information to determine the position of the receiver 101. This is owing to the low signal bandwidth. Thus, the present system and method excels when deployed alongside another non-GNSS navigation system, such as a dead-reckoning system based on inertial measurements, as mentioned above and described in more detail below. Advantageously, the present system and method offset the weaknesses of an inertial measurement system and, in turn, an inertial measurement system offsets the weakness of the present system and method. In particular, inertial measurement systems are capable of providing rapid updates in position, but have a tendency to drift away from the true position over time. The present system and method takes time to receive the longwave signals and determine the position of the receiver, but does not suffer from the same drift as an inertial measurement system. Thus, when used in combination, an inertial measurement system can be used to provide rapid updates to the position of the receiver, while the method described above with respect to FIG. 3 can be used to periodically correct the drift in the inertial measurement system. The method of FIG. 3 can therefore be extended, as depicted in FIG. 4.

Figure 4:
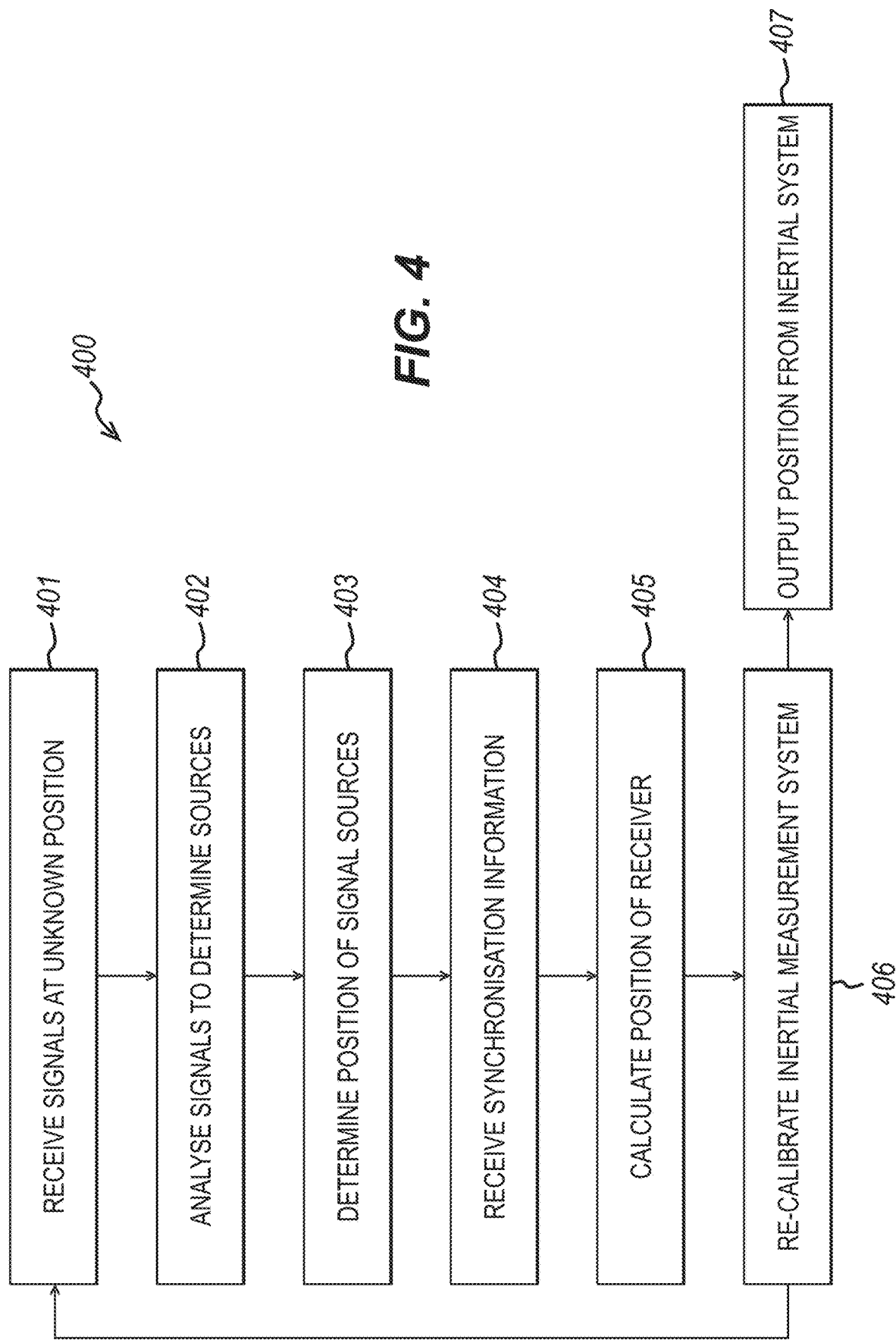
FIG. 4 depicts a further positioning method of the present invention.

Steps 401 to 405 of FIG. 4 proceed as outlined above with respect to FIG. 3. At step 406, the position calculated at step 405 is used to re-calibrate the inertial measurement system of the receiver 101 in order to correct for drift. At step 407, the position of the receiver 101 is continuously output and updated based on the inertial measurement system. Simultaneously, the process loops back to step 401 in order to begin calculating the position based on signals of opportunity again and continuously re-calibrate the inertial measurement system.

As mentioned above, an inertial navigation system provides an accurately shaped track that represents a history of position information of the navigation system over time. In other words, once the inertial navigation system is provided with a reference position (using GNSS or some other technique), it is able to determine a plurality of positions of the navigation system over time, each position being relative to the previous position and/or, ultimately, the reference position. As already mentioned, over time, inertial navigation systems are prone to drift, for example in the location or orientation of the determined 'track' or history of position information. However, the shape of that track (i.e. the relative distances and offsets of each determined position in the track relative to some or all of the other determined positions—at least relative to the determined position immediately preceding each one) is accurate.

Described above are two ways in which absolute position of the navigation system may be estimated based on received signals. These signals will henceforth be referred to as GNSS and uncoordinated signals, though others may be used instead.

Figure 6:
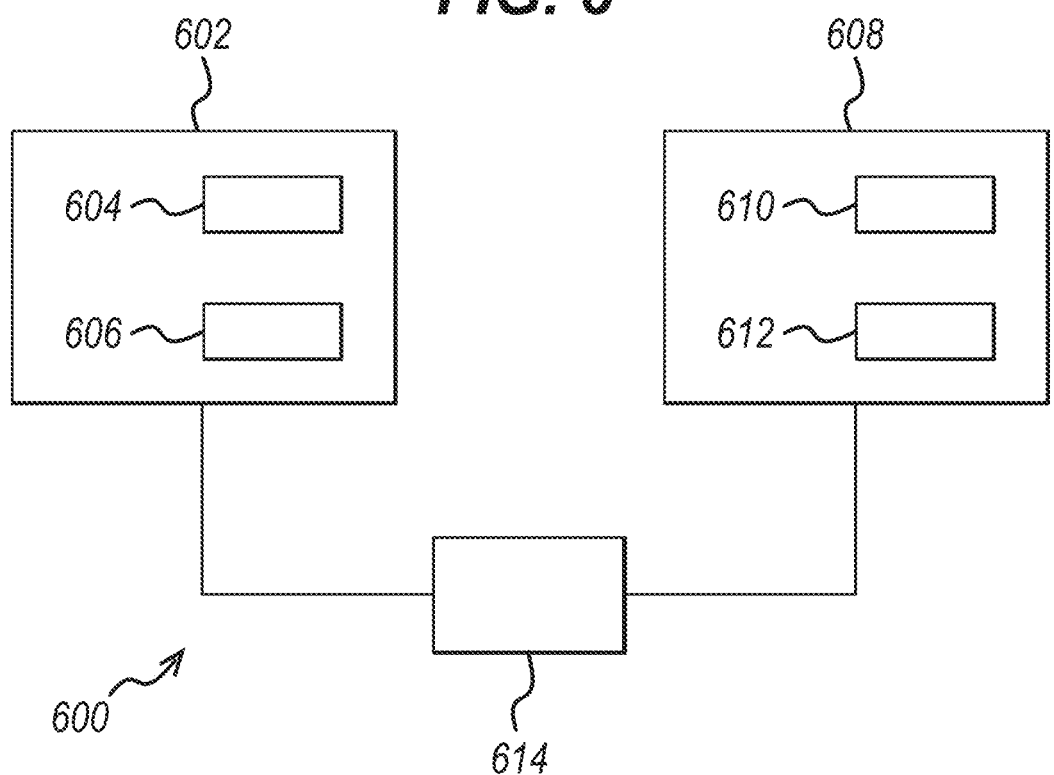
FIG. 6 is a diagram of an embodiment of a system according to the invention.

A system according to the present invention is shown in FIG. 6. The navigation system 600 comprises an inertial navigation sub-system 602 and a position estimator sub-system 608. The inertial navigation sub-system 602 is configured to determine a plurality of relative positions of the system 600 based on the determined speed and/or acceleration and/or direction of the system, and/or changes thereto, as described above. For this purpose, an inertial navigation sub-system 602 may comprise a multiplicity of sensors, including accelerometers 604, gyroscopes 606 and/or electronic compasses (not shown). The position estimator 608 may comprise one or both of a GNSS 610 and a system 612 as described above that estimates position based on uncoordinated signals.

The navigation system 600 comprises a processor 614 which does a number of things to coordinate the outputs of the inertial navigation sub-system 602 and a position estimator sub-system 608 to output a position to a user. Firstly, with reference to FIG. 7, the processor defines a first track 700 using a plurality of relative positions determined by the inertial navigation sub-system 602. The first track is defined over a period of time which may be determined by the processor. The number of positions that make up the track will depend on the duration of the period of time, and the interval between the determined positions. It will be appreciated that the more positions that make up the track in a given period of time, the more precise the track will be to the actual movement of the navigation system.

During the period of time in which the track is defined, the processor causes the position estimator 608 to generate a plurality of estimates of absolute position. The number of position estimates that can be generated will depend on the time taken to generate each estimate. For a GNSS system, this time might be short, which will enable a relatively large number of estimates to be generated. For a system using uncoordinated signals, the time needed to generate each estimate may relatively long, which will enable relatively few estimates to be generated. It will be appreciated that the more position estimates that can be generated, the better.

Figure 7:
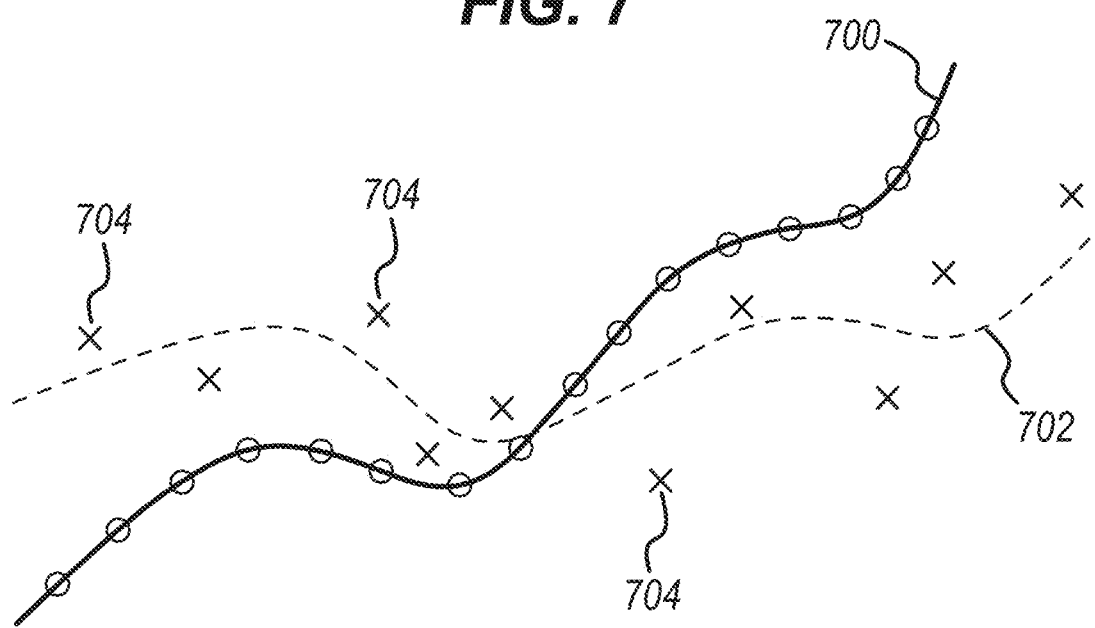
FIG. 7 shows first and second tracks that are defined by the present invention.

Again, with reference to FIG. 7, the processor defines a second track 702 using the plurality of position estimates. The way in which the processor defines the second track is as follows.

As will be appreciated, each position estimate is prone to error. This error may be caused by a number of things. In the case of GNSS, the error may be caused by one or more weak GNSS signals. Alternatively, the error may be caused by interference, which may be a high level of signal noise, which may be deliberate signal noise or 'jamming'. It is possible to quantify GNSS signal strength and level of interference, which can be particularly useful, as described further below.

In defining the second track based on the position estimates, the processor firstly assumes that the second track has the same shape as the first track determined by the inertial navigation system. Once the shape of the second track is established, the track is positioned and oriented to the position estimates based on a best fit. The best fit calculation may be performed using any conventional technique, including regression analysis such as a linear regression or a least squares analysis.

In more detail, and with reference to FIG. 7, suppose the first track 700 is determined using the inertial navigation system and a plurality of position estimates 704 are generated based on receipt and processing of uncoordinated signals using a method described in more detail elsewhere herein. As explained above, it will be appreciated that because the first track 700 is prone to drift in its position and orientation, and because position estimates 704 are prone to error, both are inadequate in determining actual position, but both may be combined to provide an improved system.

The process of fitting a second track 702 that has the same shape as the first track 700 to the position estimates 704 involves determining the least error between each position estimate 704 and the second track 702, for example using a least squares analysis. The track 702 is therefore a more accurate indicator of actual position because it combines the precise track shape determined by the inertial navigation system and an average of a plurality of position estimates 704 which minimizes their error.

It will be appreciated that a system or method can be implemented as described above whether or not the position estimates are determined from GNSS signals or uncoordinated signals. As described above, uncoordinated signals suffer from error, in part owing to the time it takes for each estimate to be generated (during which time the position of the navigation system will have changed). Whilst GNSS signals can be accurate, often they are not because of low signal strength or because they are being jammed. The system or method of the present invention is therefore beneficial irrespective of the signal being received.

Additional benefits of the invention can be realized when GNSS and/or uncoordinated signals are used. As mentioned elsewhere, it is possible to quantify both signal strength and the level of interference which may be indicative of the jamming environment, for example by reference to the signal to noise ratio. Accordingly, where GNSS and/or uncoordinated signals are used to estimate position, each position estimate can be associated with a level of confidence that is based on signal strength and/or level of interference and/or signal to noise ratio. As will be appreciated, the level of confidence will be proportional to the signal strength and inversely proportional to the level of interference. It will also be appreciated that because both a GNSS system and an uncoordinated signal system operates using multiple signals, the level of confidence may be based on the lowest signal strength, or the average signal strength or some other calculation.

Once each position estimate is associate with a level of confidence, the level may be used in the calculation of the best-fit, described above, by a process of weighting each estimate accordingly. For example, position estimates associated with higher levels of confidence may be given higher weightings than position estimates associated with lower levels of confidence. This may be implemented in variety of ways; for example, estimates below a certain level of confidence may be disregarded, or alternatively each estimate is simply weighted in proportion to the level of confidence.

Once the second track has been defined, the processor 614 may determine a deviation between the first track and the second track, which may be a deviation in one or both of the position and orientation of the track. Once the deviation has been determined, the processor may update the reference position, either by adjusting the original reference position by which all subsequent position determinations are made by the inertial navigation system, or simply by defining a new reference position for the inertial navigation system based on the second track. The process may then repeat.

It will be appreciated that the above system and method are particularly useful where certain conventional navigational techniques are compromised, but may not be the most preferred in all situations. In many environments, a GNSS system may be the most appropriate to use. A system and method according to the present invention may therefore determine when to rely on, for example, a GNSS system, and when to rely on other techniques for determining location.

In one embodiment, the system is configured to operate in one of two modes. In a first 'normal' mode, the system may output location information to a user based upon estimates of absolute position that are generated using GNSS signals. In a second 'distressed' mode, the system may output location data based upon other navigation sub-systems. For example, the system may instead output location data based upon an output of the inertial navigation system (i.e. a determined relative position of the system from the reference position), or may output location data based upon estimates of the absolute position that are generated using uncoordinated signals. Alternatively, the system may output location data based on a combination of the output of the inertial navigation system and the estimates of the absolute position that are generated using uncoordinated signals, as described above. The system may switch from operating in 'normal' mode to operating in 'distressed' mode when GNSS signals are unavailable, for example, or when the confidence level associated with the GNSS signals drops below a certain threshold.

The present invention has been described by reference to examples and illustrated embodiments, but is defined in the following claims.

What is claimed is:

1. A navigation system comprising:
   an inertial navigation sub-system configured to determine a plurality of relative positions of the navigation system from a reference position based on at least one of: a speed of the navigation system, an acceleration of the navigation system, a direction of the navigation system, or changes thereto;
   a position estimator sub-system configured to estimate an absolute position of the navigation system based on at least two received signals; and
   at least one processor configured to:
     define a first track based on the plurality of relative positions determined by the inertial navigation sub-system during a period of time;
     cause the position estimator sub-system to generate a plurality of estimates of the absolute position of the navigation system during the period of time;
     define a second track based on the plurality of estimates of the absolute position by calculating a best fit using the plurality of estimates of the absolute position and a shape of the first track;

determine a deviation in at least one of a position or an orientation of the first track based on at least one of a position or an orientation of the second track; and one of: update the reference position or generate a new reference position for the inertial navigation sub-system based on the determined deviation.

2. The navigation system of claim 1, wherein the at least one processor is configured to calculate the best fit by performing a regression analysis on the plurality of estimates of the absolute position.

3. The navigation system of claim 1, wherein:
the at least two received signals include at least two uncoordinated signals; and
each of the at least two uncoordinated signals comprises timing information and is provided from a separate fixed terrestrial or geostationary source.

4. The navigation system of claim 1, wherein each of the plurality of estimates of the absolute position is associated with a confidence level based on one or both of:
a strength of one or more of the at least two received signals used to generate the estimate; and
a level of radio frequency interference at a time the estimate is generated.

5. The navigation system of claim 1, wherein the at least one processor is configured to apply a weighting to at least one of the plurality of estimates of the absolute position and calculate the best fit based on the applied weighting.

6. The navigation system of claim 1, wherein the at least one processor is further configured to update the reference position or generate the new reference position for the inertial navigation sub-system based on a position estimate from the position estimator sub-system.

7. The navigation system of claim 4, wherein the at least one processor is further configured to update the reference position or generate the new reference position for the inertial navigation sub-system when the confidence level is above a threshold value.

8. The navigation system of claim 1, wherein:
in a first mode, the navigation system is configured to output a first location to a user based upon estimates of absolute position that are generated based on global navigation satellite system (GNSS) signals; and
in a second mode, the navigation system is configured to output a second location to the user based upon one or both of:
a determined relative position of the navigation system from the reference position, and
estimates of absolute position that are generated based on uncoordinated signals.

9. The navigation system of claim 8, wherein the first location is based upon estimates of absolute position that are generated based only on the GNSS signals.

10. The navigation system of claim 8, wherein the navigation system is configured to switch from operating in the first mode to operating in the second mode when a confidence level of at least one of the estimates of the absolute position is below a threshold.

11. A method for determining a position of a navigation system, the method comprising:
determining, using an inertial navigation sub-system of the navigation system, a plurality of relative positions of the navigation system from a reference position based on at least one of: a speed of the navigation system, an acceleration of the navigation system, a direction of the navigation system, or changes thereto;
defining, using at least one processor, a first track based on the plurality of relative positions determined during a period of time;
generating, using a position estimator sub-system of the navigation system, a plurality of estimates of an absolute position of the navigation system based on at least two received signals during the period of time;
defining, using the at least one processor, a second track based on the plurality of estimates of the absolute position by calculating a best fit using the plurality of estimates of the absolute position and a shape of the first track;
determining, using the at least one processor, a deviation in at least one of a position or an orientation of the first track based on at least one of a position or an orientation of the second track; and
using the at least one processor, one of: updating the reference position or generating a new reference position based on the determined deviation.

12. The method of claim 11, wherein calculating the best fit comprises performing a regression analysis on the plurality of estimates of the absolute position.

13. The method of claim 11, wherein:
the at least two received signals include at least two uncoordinated signals; and
each of the at least two uncoordinated signals comprises timing information and is provided from a separate fixed terrestrial or geostationary source.

14. The method of claim 11, wherein generating the plurality of estimates of the absolute position comprises associating each estimate with a confidence level based on one or both of:
a strength of one or more of the at least two received signals used to generate the estimate; and
a level of radio frequency interference at a time the estimate is generated.

15. The method of claim 11, wherein calculating the best fit comprises:
applying a weighting to at least one of the plurality of estimates of the absolute position; and
calculating the best fit based on the applied weighting.

16. The method of claim 11, further comprising:
updating the reference position or generating the new reference position based on a position estimate.

17. The method of claim 14, further comprising:
updating the reference position or generating the new reference position only when the confidence level is above a threshold value.

18. The method of claim 11, further comprising:
in a first mode, outputting a first location to a user based upon estimates of absolute position that are generated based on global navigation satellite system (GNSS) signals; and
in a second mode, outputting a second location to the user based upon one or both of:
a determined relative position of the navigation system from the reference position, and
estimates of absolute position that are generated based on uncoordinated signals.

19. The method of claim 18, wherein the first location is based upon estimates of absolute position that are generated based only on the GNSS signals.

20. The method of claim 18, further comprising:
switching from operating in the first mode to operating in the second mode when a confidence level of at least one of the estimates of the absolute position is below a threshold.

21. An apparatus comprising:
at least one processor for a navigation system, the at least one processor configured to:
receive a plurality of relative positions from an inertial navigation sub-system during a period of time;
define a first track based on the plurality of relative positions;
receive a plurality of estimates of absolute position from a position estimator sub-system during the period of time;
define a second track based on the plurality of estimates of the absolute position by calculating a best fit using the plurality of estimates of the absolute position and a shape of the first track;
determine a deviation in at least one of a position or an orientation of the first track based on at least one of a position or an orientation of the second track; and
one of: update a reference position or generate a new reference position for the inertial navigation sub-system based on the determined deviation.

22. The apparatus of claim 21, wherein the at least one processor is further configured to generate a modifier to be sent to the inertial navigation sub-system based on the determined deviation.

23. A non-transitory computer readable medium containing computer readable instructions that when executed cause at least one processor of a navigation system to:
obtain, from an inertial navigation sub-system of the navigation system, a plurality of relative positions of the navigation system from a reference position based on at least one of: a speed of the navigation system, an acceleration of the navigation system, a direction of the navigation system, or changes thereto;
define a first track based on the plurality of relative positions determined during a period of time;
obtain, from a position estimator sub-system of the navigation system, a plurality of estimates of an absolute position of the navigation system based on at least two received signals during the period of time;
define a second track based on the plurality of estimates of the absolute position by calculating a best fit using the plurality of estimates of the absolute position and a shape of the first track;
determine a deviation in at least one of a position or an orientation of the first track based on at least one of a position or an orientation of the second track; and
one of: update the reference position or generate a new reference position based on the determined deviation.

24. The non-transitory computer readable medium of claim 23, further containing computer readable instructions that when executed cause the at least one processor to:
in a first mode, output a first location to a user based upon estimates of absolute position that are generated based on global navigation satellite system (GNSS) signals; and
in a second mode, output a second location to the user based upon one or both of:
a determined relative position of the navigation system from the reference position, and
estimates of absolute position that are generated based on uncoordinated signals.

25. The apparatus of claim 21, wherein the at least one processor is further configured to:
in a first mode, output a first location to a user based upon estimates of absolute position that are generated based on global navigation satellite system (GNSS) signals; and
in a second mode, output a second location to the user based upon one or both of:
a determined relative position of the navigation system from the reference position, and
estimates of absolute position that are generated based on uncoordinated signals.

* * * * *